United States Patent [19]

Murakami et al.

[11] Patent Number: 5,113,395
[45] Date of Patent: May 12, 1992

[54] FRAME PHASE ALIGNING SYSTEM USING A BUFFER MEMORY WITH A REDUCED CAPACITY

[75] Inventors: Kurenai Murakami; Tutomu Murase, both of Tokyo, Japan

[73] Assignee: NEC Corporation, Tokyo, Japan

[21] Appl. No.: 582,567

[22] Filed: Sep. 14, 1990

[30] Foreign Application Priority Data

Sep. 14, 1989 [JP] Japan ................................. 238502

[51] Int. Cl.⁵ ............................................. H04J 3/06
[52] U.S. Cl. ................................. 370/102; 370/105.1
[58] Field of Search ............. 370/102, 44.3, 60, 105.1

[56] References Cited

U.S. PATENT DOCUMENTS

| | | | |
|---|---|---|---|
| 4,606,023 | 8/1986 | Dragoo | 370/94.3 |
| 4,649,539 | 3/1987 | Krinock | 370/102 |
| 4,667,324 | 5/1987 | Graves | 370/102 |
| 4,819,226 | 4/1989 | Beckner et al. | 370/60 |
| 4,833,673 | 5/1989 | Chao et al. | 370/102 |
| 4,967,410 | 10/1990 | Takase et al. | 370/105.1 |

Primary Examiner—Douglas W. Olms
Assistant Examiner—T. Samuel
Attorney, Agent, or Firm—Sughrue, Mion, Zinn, Macpeak & Seas

[57] ABSTRACT

In a frame aligner for frame aligning an input time-division multiplexed (TDM) signal to an output frame synchronous signal, an input frame signal of the TDM signal is separated into a transport overhead carrying an input frame synchronous signal and a message pointer and a subframe carrying data signal. A fresh overhead having a fresh pointer is made corresponding to a phase difference between said input and said output frame synchronous signals and said subframe is sequentially written into and read from a buffer memory. The fresh overhead and the subframe read are multiplexed to form an output TDM frame signal which is synchronized with the output frame synchronous signal. The buffer memory is permitted to have a reduced memory capacity storable a number of channel signals equal to that of time slots carrying the overhead. When the input frame signal is asynchronous with an output clock signal, the input frame signal is converted to a converted frame signal which is synchronized with the output clock signal before the frame alignment is performed.

6 Claims, 7 Drawing Sheets

FRAME PHASE ALIGNING SYSTEM USING A BUFFER MEMORY WITH A REDUCED CAPACITY

BACKGROUND OF THE INVENTION

The present invention relates to a time division multiplex (TDM) communication system and, in particular, to a frame phase alignment for use in a system.

In the TDM communication system, a plurality of data signals or channel signals are time-division multiplexed with each other to form a frame signal together with a transport overhead signal for controlling transportation of the data signals in the frame signal. That is, a frame format of the frame signal consists of a plurality of time slots. Some of the time slots are assigned for carrying the transport overhead signal and are called an overhead portion. The remaining time slots are assigned for carrying the data signals, respectively, and are called a subframe portion.

The data signals have different channel numbers and are assigned to the time slots in the subframe portion in the order of the channel numbers. Therefore, when a particular one of the time slots is indicated for carrying a leading one of the data signals, the remaining time slots are automatically determined for individually carrying the remaining data signals.

In order to indicate the position of the particular time slot in the frame signal, the overhead portion has information of the number of time slots from the overhead portion to the particular time slot which information is called a message pointer or a data pointer.

In the TDM communication system, a plurality of TDM signals are required to be synchronized with each other in order to, for example, perform exchange or switching between time slots in those TDM signals. To this end, a frame aligner is conventionally used in the TDM communication system.

A known frame aligner comprises a buffer memory in which an input frame signal is stored and is then read from the buffer memory under control of a frame synchronous signal on an output side, which will be referred to as an output frame synchronous signal, so that the input frame signal is phase shifted and is reproduced with a different frame phase synchronized with the output frame synchronous signal as an output frame signal. Thus, a plurality of TDM signals are synchronized with each other by use of frame aligners using a common output frame synchronous signal.

However, the known frame aligner has a disadvantage that the buffer memory has a memory capacity sufficient to store are of a single frame signal. Furthermore, when a large phase difference is between the input and the output frame signals, a large delay is caused at the buffer memory and therefore results in degradation of the signal in performance.

The TDM communication system sometimes deals with frame signals which are different from or asynchronous with each other in bit rates or clocks. In order to perform the frame phase alignment of those different TDM signals, it is required that those TDM signals are previously matched to each other in the bit rate.

SUMMARY OF THE INVENTION

It is an object of the present invention to provide a method and a system which enable the frame phase alignment with a reduced resultant delay in use of a buffer memory of a reduced memory capacity.

It is another object of the present invention to provide a frame phase aligner which enables frame alignment between frame signals of different bit rates.

According to the present invention, a method is obtained which is for phase-aligning a time-division multiplexed signal as an input frame signal to an output frame synchronous signal to produce an output frame signal, a frame format of the input frame signal consisting of an input subframe portion carrying a plurality of channel signals and an input overhead portion carrying a transport overhead signal for controlling transport of the channel signals, the input overhead portion comprising an input frame synchronous signal. The method comprises steps of: separating the input overhead portion as a separated overhead portion from the input frame signal, the channel signals of the input subframe portion being sequentially stored in a buffer memory as a stored channel signals; making an output overhead portion determined by a phase difference between the input and the output synchronous signals in response to the separated overhead portion; delivering the output overhead portion into a portion in the output frame signal in response to the output frame synchronous signal; and reading the stored channel signals from the buffer memory as read channel signals to deliver the read channel signals into the remaining portion in the output frame signal, so that the output frame signal consists of the output overhead portion and an output subframe portion carrying the read channel signals.

The present invention provides a device for phase-aligning a time-division multiplexed signal as an input frame signal to an output frame synchronous signal to produce an output frame signal, a frame format of the input frame signal consisting of an input subframe portion carrying a plurality of channel signals and an input overhead portion carrying a transport overhead signal for controlling transport of the channel signals, and the input overhead portion comprising an input frame synchronous signal. The device comprises: separating means receiving the input frame signal for separating the input frame signal into the input overhead portion and the input subframe portion as a separated overhead portion and a separated subframe portion, respectively; storing means coupled to the separating means for storing the separated subframe portion; making means coupled to the separating means and responsive to the separated overhead portion and the output frame synchronous signal for making an output overhead portion determined by a phase difference between the input and the output synchronous signals; and multiplexing means coupled to the storing means and the making means and responsive to the output frame synchronous signal for delivering the output overhead portion into a portion of the output frame signal, the multiplexing means reading the stored channel signal from the storing means as read channel signals to deliver the read channel signals into the remaining portion of the output frame signal, so that the output frame signal consists of the output overhead portion and an output subframe portion carrying the read channel signals.

Further, the present invention provides a device for phase-aligning an input time-division multiplexed signal having an input clock signal to an output frame synchronous signal synchronized with an output clock signal different from the input clock signal to produce an output frame signal, the device comprising converting means for converting the input frame signal of the input clock signal into a clock converted frame signal of the output clock signal, a frame format of the clock converted frame signal consisting of a converted subframe portion carrying a plurality of a converted channel signals and a converted overhead portion carrying a transport overhead signal for controlling transport of the channel signals, and the converted overhead portion comprising a converted frame synchronous signal. The device further comprises: separating means receiving the clock converted frame signal for separating the clock converted frame signal into the converted overhead portion and the converted subframe portion as a separated overhead portion and a separated subframe portion, respectively; storing means coupled to the separating means for storing the separated subframe portion; making means coupled to the separating means and responsive to the separated overhead portion and the output frame synchronous signal for making an output overhead portion determined by a phase difference between the converted and the output frame synchronous signals; and multiplexing means coupled to the storing means and the making means and responsive to the output frame synchronous signal for delivering the output overhead portion into a portion of the output frame signal, the multiplexing means reading the stored channel signals from the storing means as read channel signals to deliver the read channel signals into the remaining portion of the output frame signal, so that the output frame signal consists of the output overhead portion and an output subframe portion carrying the read channel signals.

DESCRIPTION OF THE PREFERRED EMBODIMENTS

Prior to description of preferred embodiments, a known frame aligner will be described with reference to FIGS. 1 and 2 so as to help the better understanding of the present invention.

Figure 1:
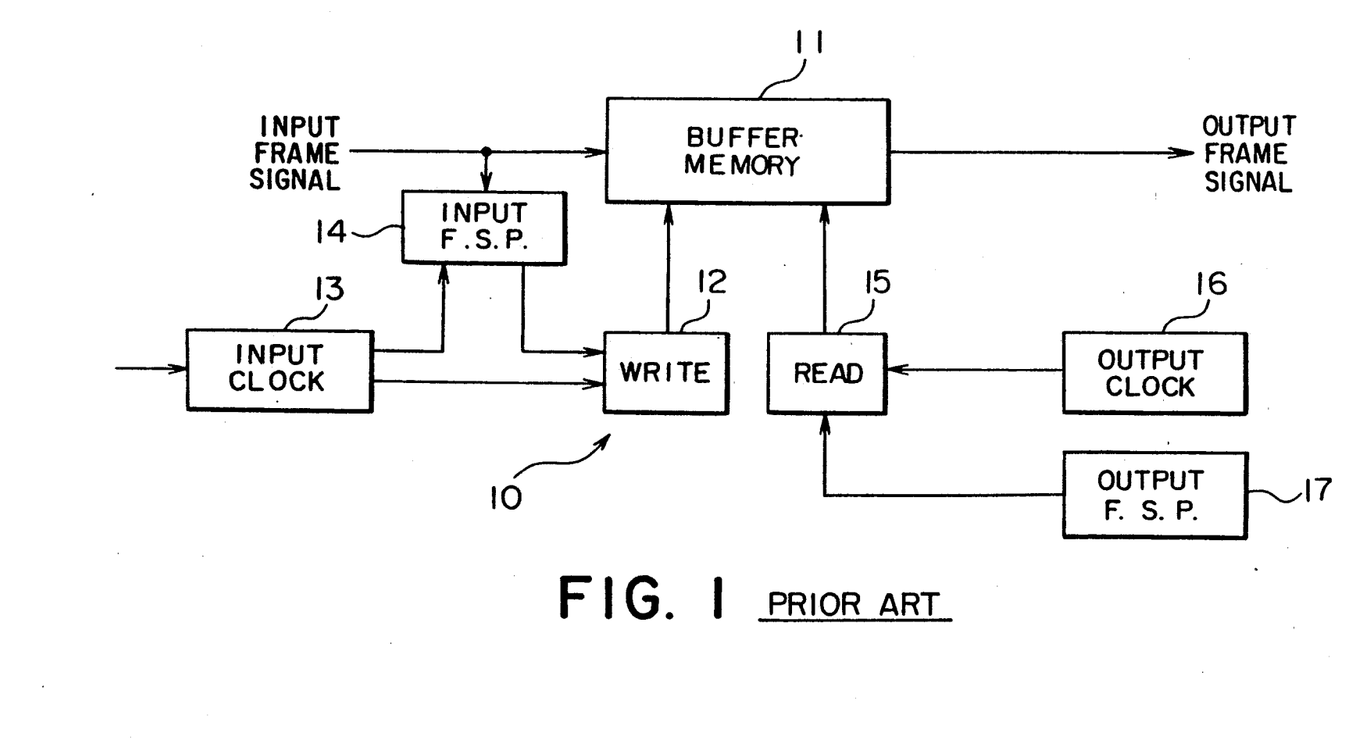
FIG. 1 is a schematic block diagram view of a known frame aligner.

Referring to FIG. 1, the known frame aligner 10 comprises a buffer memory 11 to which an input frame signal is stored under control of a writing circuit 12.

An input clock generating circuit 13 produces a clock signal as an input clock by derivation from the input frame signal or other known method. An input frame synchronous signal (F.S.P.) generating circuit 14 also produces the input frame synchronous signal by deriving a frame synchronous signal from the input frame signal. The input clock and the input synchronous signal are supplied to the writing circuit 12 so as to control the writing operation.

The frame signal stored in the buffer memory 11 is read as an output frame signal from the buffer memory 11 under control of a read circuit 15. An output clock generator 16 produces an output clock signal synchronous with the input clock signal, while an output frame synchronous signal generator 17 generates an output frame synchronous signal which is generated at a predetermined time instant and is different from or delayed from the input frame synchronous signal in phase.

Figure 2:
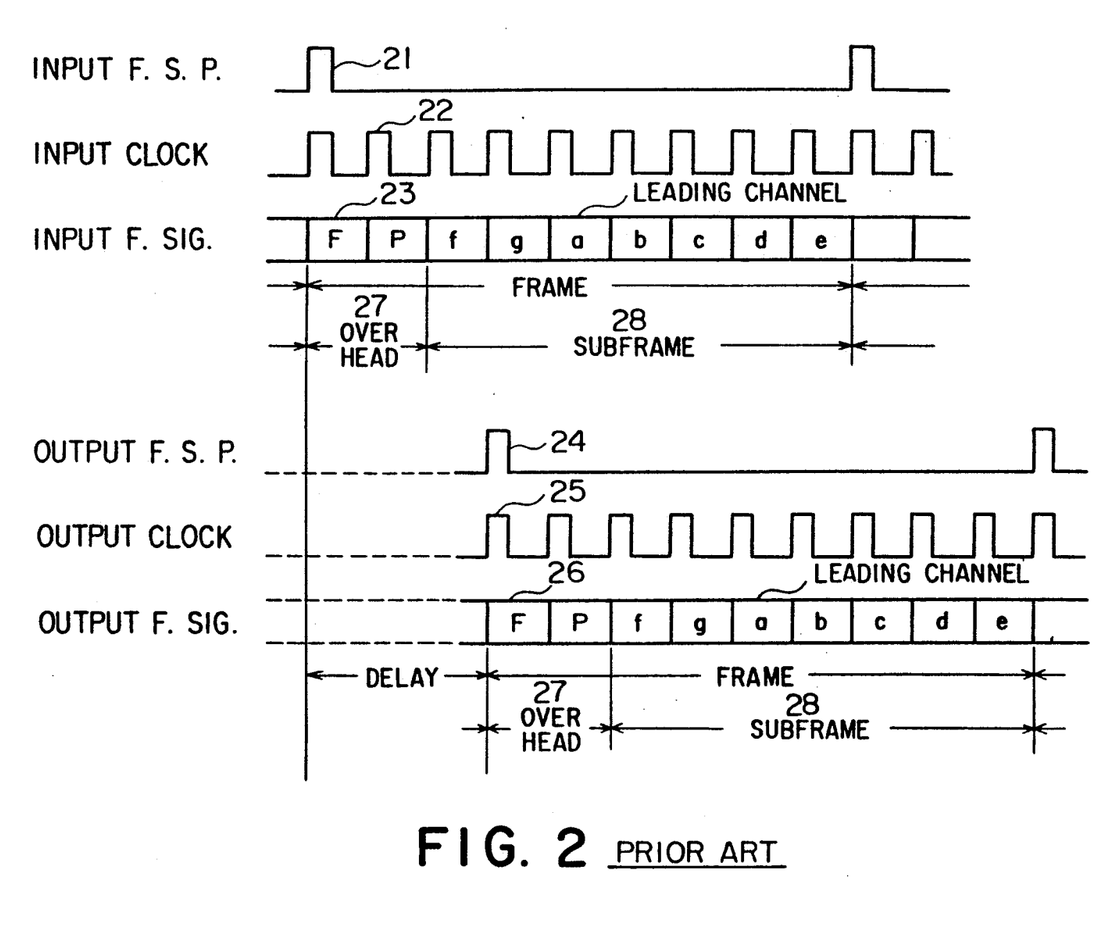
FIG. 2 is a view illustrating time relationships between various signals in the aligner in FIG. 1.

FIG. 2 shows time relationships of the input frame synchronous signal 21, the input clock signal 22, the input frame signal 23, the output frame synchronous signal 24, the output clock signal 25 and the output frame signal 26. The output frame signal 26 is equal to the input frame signal but with a delay equal to the phase difference between the input frame synchronous signal 22 and the output frame synchronous signal 24. Accordingly, the buffer memory is required to have a capacity sufficient to store one entire frame signal in order to permit the maximum delay of the output frame synchronous signal, that is, one frame delay.

Now, description will be made as regards a format of the frame signal. As shown at 23 and 26 in FIG. 2, the frame signal comprises a plurality of time slots (nine time slots are shown) some of which (two in the figure) are assigned to an overhead portion 27 for carrying a transport overhead with the remaining time slots (seven slots in the figure) assigned to a subframe portion 28 for carrying data or message information. In the shown example, the overhead 27 consists of the frame synchronous signal F and the message pointer P, and the data information in the subframe 28 consists of seven channels a, b, ..., g. The seven channels are assigned with channel numbers and are arranged in the order of the channel numbers in the subframe 28 following the first or leading channel assigned to a particular one or the third one of the time slots in the subframe 28 after the overhead 27, as shown in the figure. Accordingly, the pointer P in the overhead 27 indicates three (3).

Figure 3:
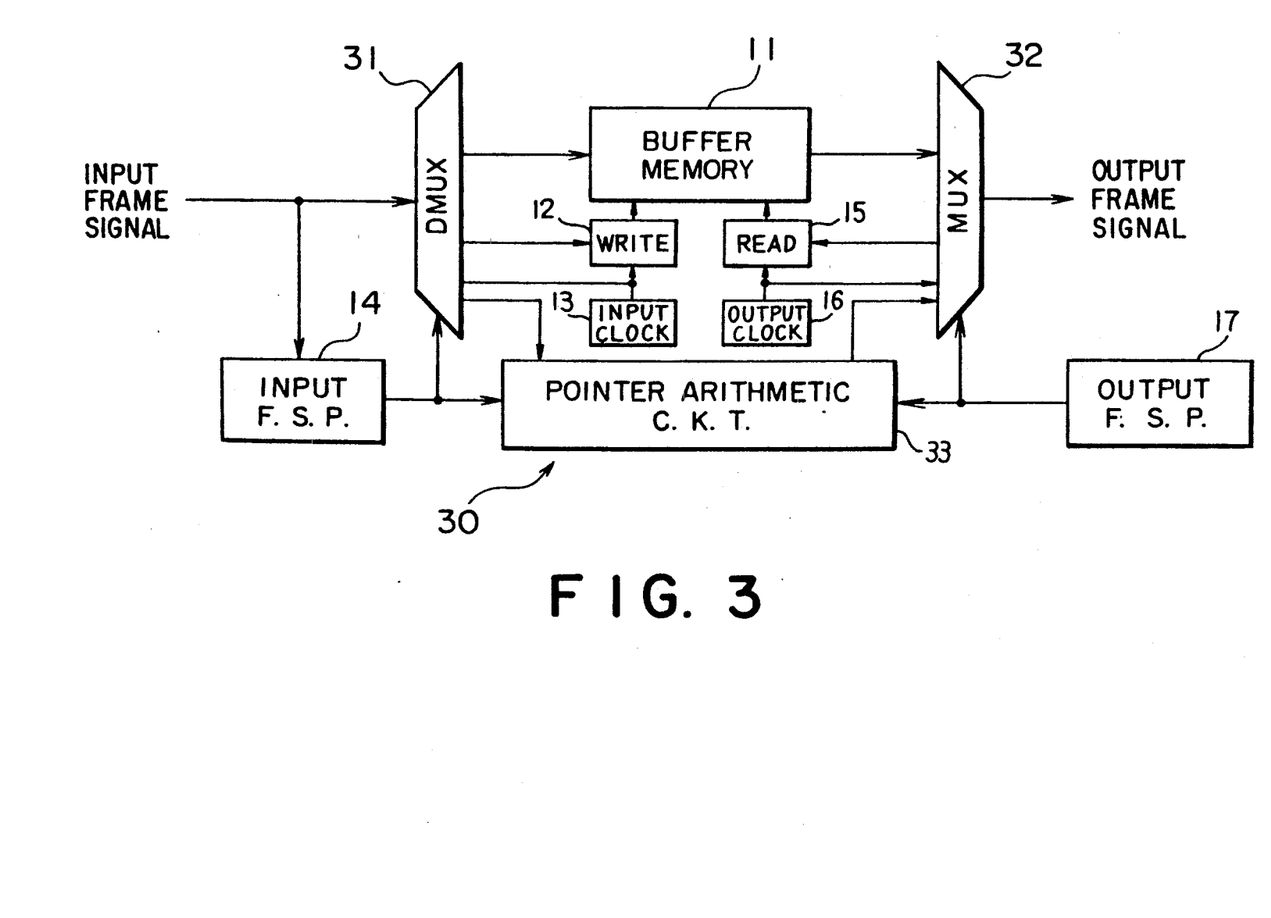
FIG. 3 is a schematic block diagram view of a frame aligner according to an embodiment of the present invention.

Referring to FIG. 3, the frame aligner 30 shown therein according to an embodiment of the present invention comprises a buffer memory 11, a writing circuit 12, an input clock generator 13, an input frame synchronous signal generator 14, a read circuit 15, an output clock generator 16, and an output frame synchronous signal generator 17 similar to the known frame aligner 10 in FIG. 1, but the frame aligner 30 further comprises a demultiplexer 31 for separating the input frame signal into the overhead portion and the subframe portion as a separated overhead portion and a separated subframe portion, respectively, a multiplexer 32 for multiplexing a subframe signal read from the buffer memory 11 and a fresh overhead signal to produce the output frame signal, and a pointer arithmetic circuit 33 for preparing the fresh overhead signal.

The demultiplexer 31 receives the input frame signal 23 (FIG. 4), the input clock 22 (FIG. 4), and the input frame synchronous signal 21 (FIG. 4) and separates the overhead portion 27 from the subframe portion 28 of the frame signal to deliver the separated overhead portion and the separated subframe portion to the pointer arithmetic circuit 33 and the buffer memory 11, respectively. The demultiplexer 31 also produces a write unable signal to the writing circuit 12 when the demultiplexer 31 delivers the separated overhead portion to the pointer arithmetic circuit 33, while the demultiplexer 31 produces a write enabling signal to the writing circuit 12 when the demultiplexer 31 delivers the separated subframe portion to the buffer memory 11. Accordingly, the writing circuit 12 is responsive to the write enabling signal and writes the subframe portion to the buffer memory 11.

Figure 4:
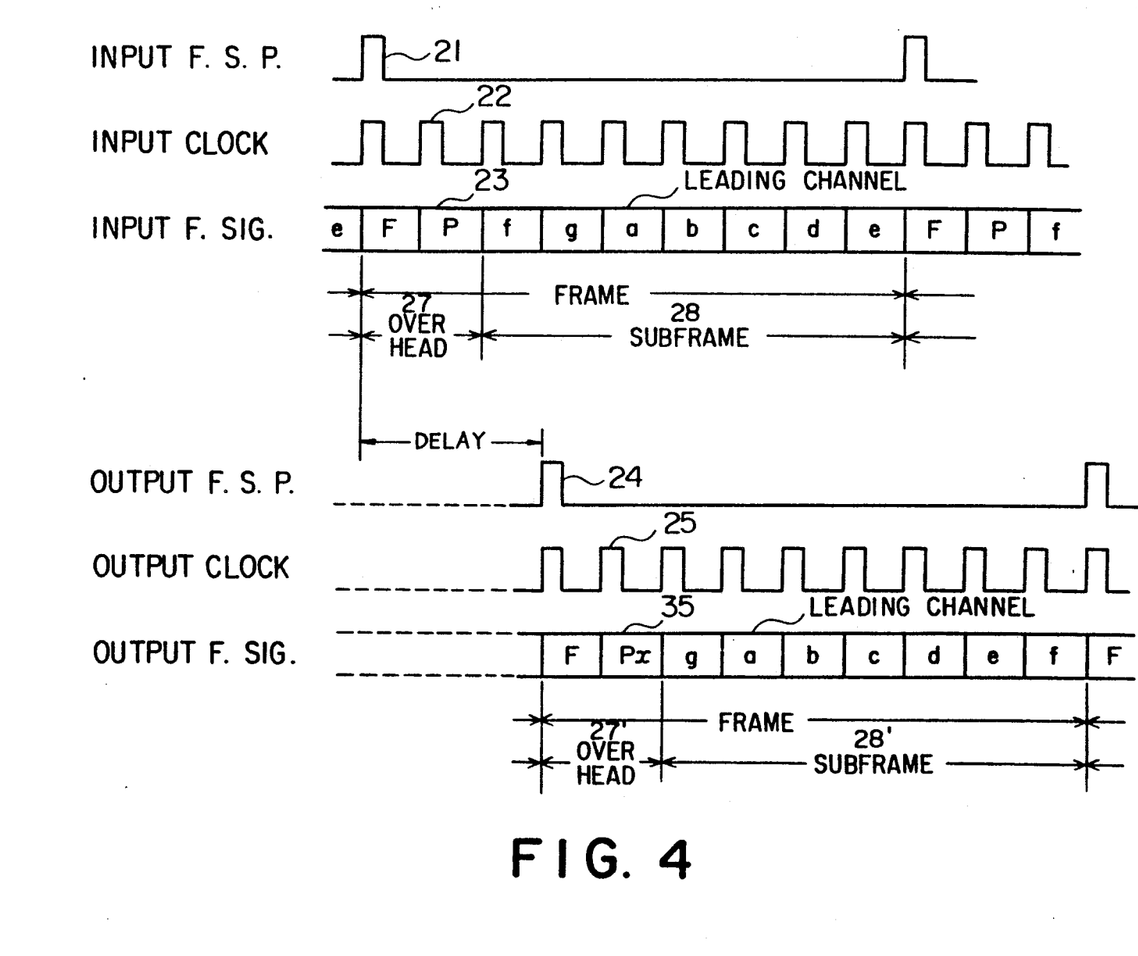
FIG. 4 is a view illustrating time relationships between various signals in the aligner in FIG. 3.

The multiplexer 32 receives the output clock 25 (FIG. 4), and the output frame synchronous signal 24 (FIG. 4). When the overhead portion 27' (FIG. 4) of the output frame signal should be delivered from the multiplexer 32, the multiplexer 32 takes into the fresh overhead signal from the pointer arithmetic circuit 33 and delivers the fresh overhead signal therefrom as the overhead portion of the output frame signal 35 (in FIG. 4), with a read unable signal to the read circuit 15. The multiplexer 32 also produces a read enabling signal to the read circuit 15 when the multiplexer 32 delivers a subframe portion 28' (FIG. 4) of the output frame signal therefrom. Accordingly, the read circuit 15 is responsive to the read enabling signal and reads the subframe portion stored in the buffer memory 11 as a read subframe signal. The read subframe signal is delivered from the multiplexer 32. Thus, the fresh overhead signal and the read subframe signal are multiplexed by the multiplexer 32 and are delivered therefrom as the output frame signal 35 shown in FIG. 4.

As described above, the subframe portion of the input frame signal is only stored in the buffer memory 11 and is then read from the buffer memory 11 only when the read circuit 15 receives the enabling signal from the multiplexer 32. That is, the subframe portion stored in the buffer memory 11 is not read from the buffer memory 11 when the fresh overhead portion is taken from the pointer arithmetic circuit 33 and delivered from the multiplexer 32. Accordingly, the buffer memory 11 stores and holds data signals in the subframe portion 28 which are provided to the buffer memory 11 when the read circuit 15 is unable.

In the embodiment shown, the overhead portion comprises two time slots and therefore, it is sufficient for the buffer memory 11 to have a capacity for storing the data signals carried by the two time slots so that no data signal in the subframe portion 28 is lost. When the read circuit 15 receives the enable signal after the fresh overhead portion is delivered from the multiplexer 32 as the overhead portion 27' in the output frame signal 35, the read circuit 15 starts to read the data signals stored in the buffer memory 11. Therefore, the order of the data signals or the channel signals in the subframe 28' in the output frame signal 35 is different from the order of the channel signals in the subframe portion 28 in the input frame signal 23 as seen in FIG. 4.

Therefore, the pointer arithmetic circuit 33 calculates a fresh message pointer Px from a delay of a phase difference of the output frame synchronous signal 24 and the input frame synchronous signal 21 and produces the fresh overhead 27' shown in FIG. 4.

Figure 5:
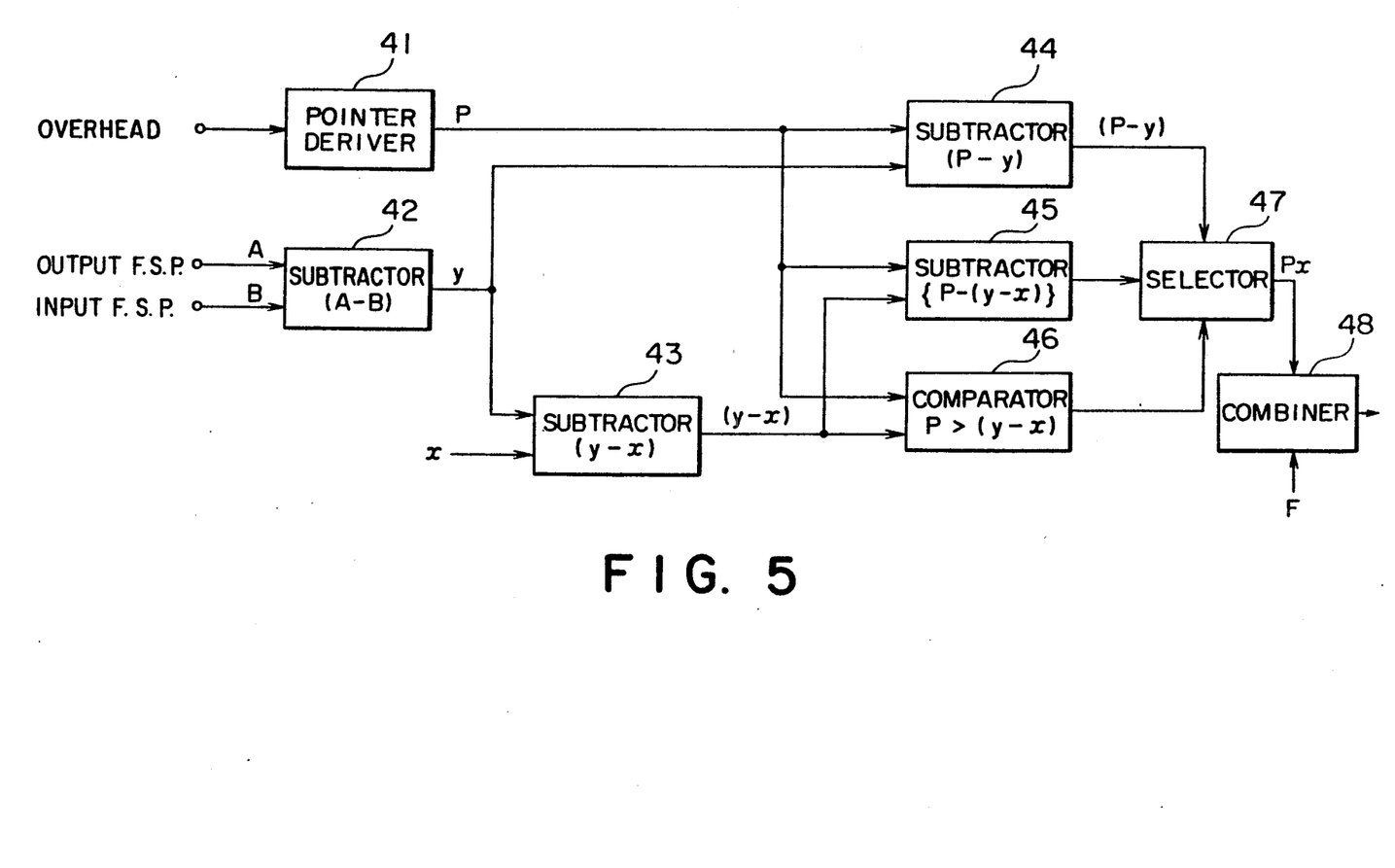
FIG. 5 is a schematic block diagram view of a pointer arithmetic circuit in FIG. 3.

Referring to FIG. 5, the pointer arithmetic circuit 33 comprises a pointer deriver 41 for deriving the message pointer P in the separated overhead portion applied thereto from the demultiplexer 31 and a subtractor 42 for calculating the delay y of the output frame synchronous signal from the input frame synchronous signal. The pointer arithmetic circuit 33 further calculates the fresh pointer Px from P, y and x which is the number of time slots assigned to the overhead portion 27 (in the embodiment shown, x=2), according to the following calculating method:

when $P \leq (y-x)$, $Px = (P-y) \bmod f1$,
when $P > (y-x)$, $Px = (P-y+x) \bmod f1$,
where f1 represents the number of the time slots or a length of the single frame.

In order to carry out the above-described calculation, the pointer arithmetic circuit 33 comprises a first subtractor 43 for performing $(y-x)$, a second subtractor 44 for calculating $(P-y) \bmod f1$, a third subtractor 45 for carrying out $\{P-(y-x)\} \bmod f1$, and a comparator 46 for comparing P and $(y-x)$ to produce a selection signal. One of $(P-y) \bmod f1$ and $(P-y+x) \bmod f1$ from the second and the third subtractors 44 and 45 is selected by a selector 47 as Px according to the selection signal from the comparator 46.

A combiner 48 combines Px and F which is separated at the pointer deriver 41 and produces the fresh overhead 27'.

When the TDM communication system uses TDM signals of different bit rates, those TDM signals must be matched to each other in the bit rate before performing the frame alignment, as described in the preamble of the present description.

Figure 6:
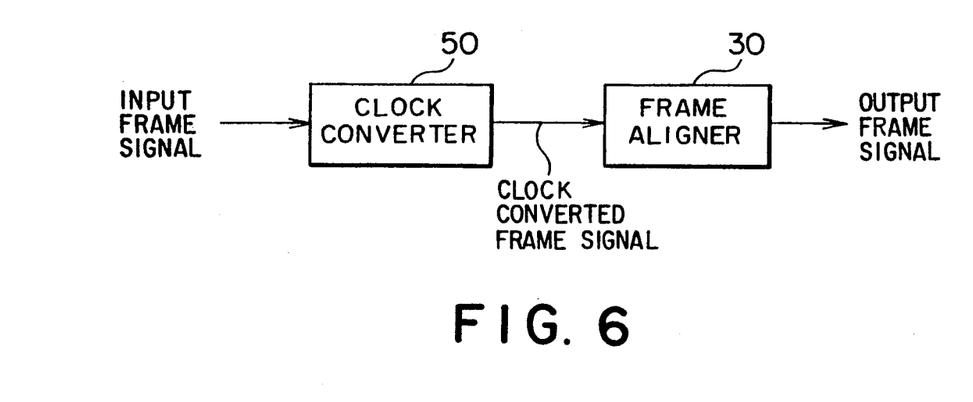
FIG. 6 is a block diagram view of a frame aligner according to another embodiment of the present invention.

To this end, a clock converter 50 is used for converting a TDM signal of an input clock to a converted TDM signal of a different output clock at a previous stage of the frame aligner 30 as shown in FIG. 6. A clock converted frame signal from the clock converter 50 is applied to the frame aligner 30 as the input frame signal which has been described in connection with FIG. 3.

Although a known one can be used as the clock converter 50, a novel clock converter will be described with reference to FIGS. 7 and 8.

It is provided that the input TDM signal is made by use of first and second pulse stuffing synchronization, that is, twice pulse stuffing synchronization, for a data signal. Therefore, the TDM signal consists of the data signal and first and second stuff pulses. The TDM signal is required to be phase-aligned to an output clock different from those of the data signal, the TDM signal and a pulse-stuffed signal by the first pulse stuffing synchronization.

Figure 7:
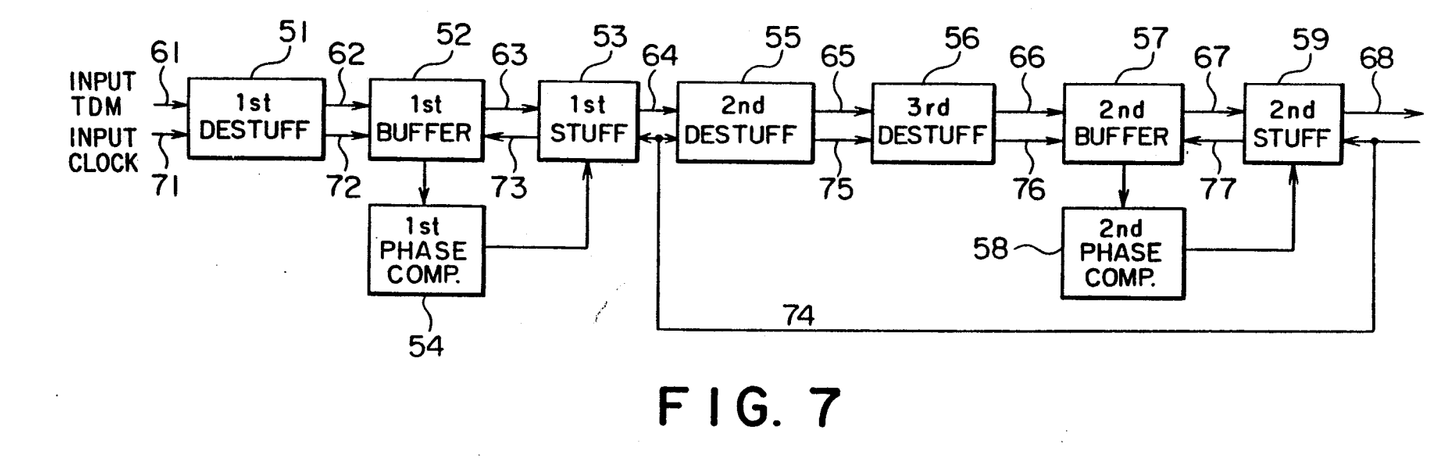
FIG. 7 is a block diagram view of a clock converter used in FIG. 6.
Figure 8:
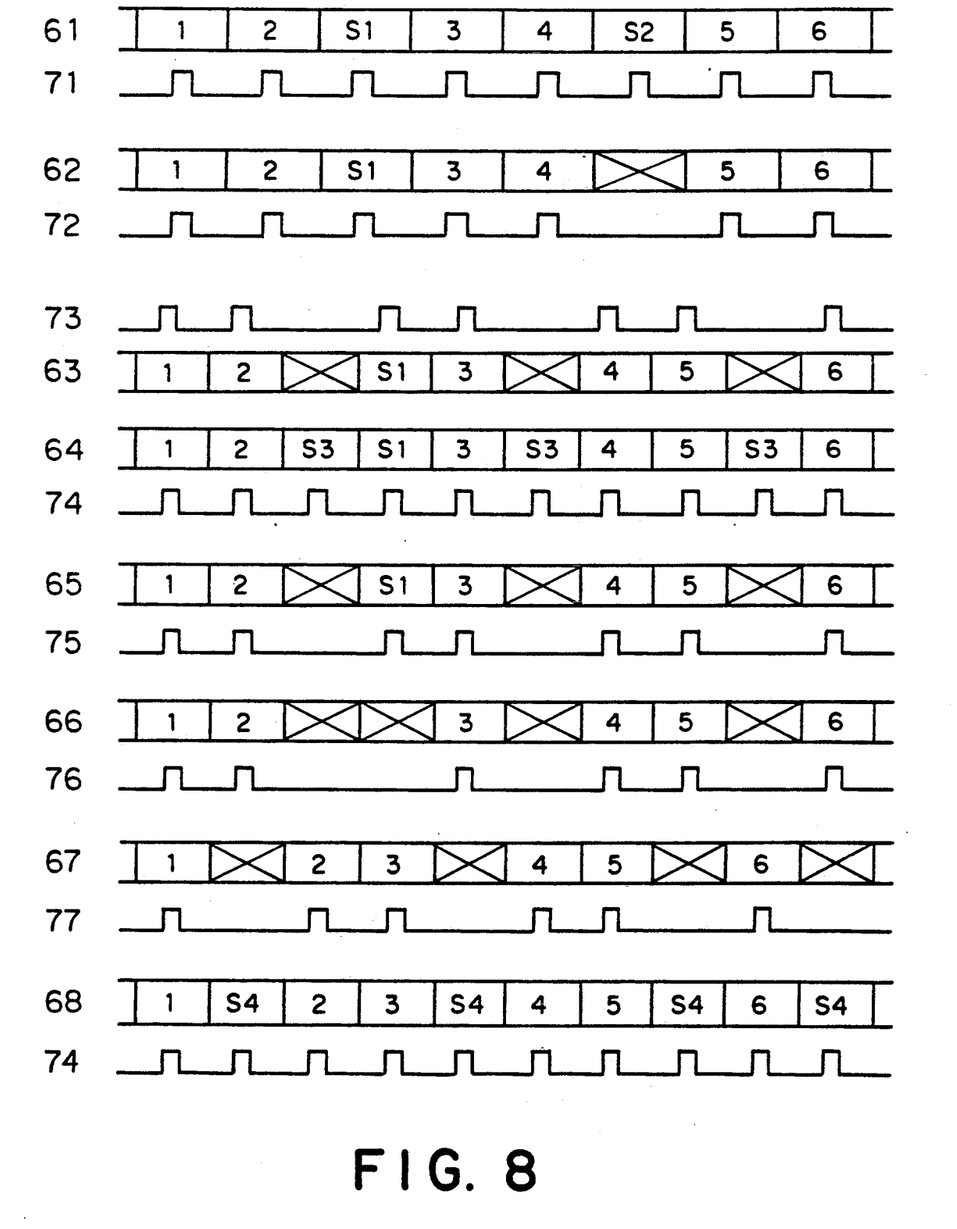
FIG. 8 is a view illustrating various signals in FIG. 7.

Referring to FIGS. 7 and 8, the clock converter 50 comprises a first destuffing circuit 51 for receiving an input TDM signal 61 and an input clock 71 to destuff the input TDM signal 61. The input TDM signal has first stuff pulse s1 and a second stuff pulse s2 in the six data pulses 1 through 6. The first destuff circuit 51 removes the second stuff pulse s2 from the input TDM signal 61 to deliver a first destuffed signal 62 to a first buffer memory 52. The first destuff circuit 51 also removes a clock pulse of the input clock 71 at a time position of the second stuff pulse s2 to deliver a first removed clock 72 to the first buffer memory 52. Thus, the first destuffed signal 62 is written into the first buffer memory 52.

A first stuffing circuit 53 delivers a second clock 73 to the first buffer memory and reads out the first destuffed signal stored therein as a first read signal 63. A phase comparator 54 compares a phase of the first removed clock 72 and a phase of the second clock 73 and produces a first error signal. The first stuffing circuit 53 receives the output clock 74 and produces the second clock 73 under control by the first error signal so that the first removed clock signal 72 and the second clock signal 73 have a common mean frequency. The first stuffing circuit 53 also adds a third stuff pulse s3 to the first read signal 63 to produce a first stuffed signal 64 which is synchronized with the output synchronous signal 74.

Then, a second destuff circuit 55 receives the first stuffed signal 64 and the output synchronous signal 74 and removes the third stuff pulses s3 from the first stuffed signal 64 and delivers a second destuffed signal 65 to a third destuffing circuit 56. The second destuff circuit 55 also removes clock pulses of the output synchronous signal 74 at time positions of the third stuff pulses s3 and delivers as a second removed clock 75 to the third destuffing circuit 56.

The third destuffing circuit 56 receives the second destuffed signal 65 and the second removed clock 75 and removes the first stuff pulse s1 to deliver a third destuffed signal 66 to a second buffer memory 57. The third destuffing circuit 56 also removes a clock pulse of the second removed clock 75 at a time position of the first stuff pulse s1 and delivers a third removed clock 76 to a second buffer memory 57.

The second buffer memory 57 receives the third destuffed signal 66 and the third removed clock 76 and stores the third destuffed signal 66.

A second stuffing circuit 59 provides a third clock 77 to the second buffer memory and reads the destuffed signal 66 stored in the second buffer memory 57 as a second read signal 67.

A second phase comparator compares a phase of the third removed clock 76 and a phase of the third clock 77 to produce a second error signal.

The second stuffing circuit 59 receives the output clock 74 and produces the third clock 77 under control by the second error signal so that the third removed clock 76 and the third clock 77 have a common mean frequency. The second stuffing circuit 59 also adds fourth stuff pulses s4 to the second read signal 67 to produce a second stuffed signal 68 which is synchronized with the output synchronous signal 74.

Thus, it is possible to obtain from the input data signal a stuffed signal of the data signal which is stuffing synchronized with the output synchronous signal.

What is claimed is:

1. A method for phase-aligning a time-division multiplexed signal as an input frame signal to an output frame synchronous signal to produce an output frame signal, a frame format of said input frame signal consisting of an input subframe portion carrying a plurality of channel signals and an input overhead portion carrying a transport overhead signal for controlling transport of said channel signals, said input overhead portion comprising an input frame synchronous signal, said method comprising steps of:

separating said input overhead portion as a separated overhead portion from said input frame signal, said channel signals of said input subframe portion being sequentially stored in a buffer memory as stored channel signals;

making an output overhead portion determined by as phase difference between said input and said output frame synchronous signals in response to said separated overhead portion;

delivering said output overhead portion into a portion in said output frame signal in response to said output frame synchronous signal; and reading said stored channel signals from said buffer memory as read channel signals to deliver said read channel signals into the remaining portion in said output frame signal, so that said output frame signal consists of said output overhead portion and an output subframe portion carrying said read channel signals.

2. A method as claimed in claim 1, said input frame consisting of a plurality of time slots the number of which is represented by f1, x of the time slots being assigned to said input overhead portion, said channel signals being assigned with different channel numbers, a leading one of said channel signals being carried by a particular one of the time slots in said input subframe portion, the remaining channel signals being assigned to the remaining time slots in said input subframe portion and being arranged in the order of said channel signals, said input overhead portion comprising a message pointer P for indicating a number of time slots between said input overhead portion and said particular time slot, said output frame synchronous signal being delayed from said input frame synchronous signal by y, x, P, and y being integers, wherein said output overhead portion comprises an output message pointer Px, said output message pointer Px is calculated by the following method:

when $P \leq (y-x)$, $Px = (P-y) \bmod f1$, when $P > (y-x)$, $Px = (P-y+x) \bmod f1$, said output frame signal has said leading channel signal in a specific time slot in said output subframe portion, Px representing a number of time slots between said output overhead portion and said specific time slot.

3. A device for phase-aligning a time-division multiplexed signal as an input frame signal to an output frame synchronous signal to produce an output frame signal, a frame format of said input frame signal consisting of an input subframe portion carrying a plurality of channel signals and an input overhead portion carrying a transport overhead signal for controlling transport of said channel signals, and said input overhead portion comprising an input frame synchronous signal, said device comprising:

separating means receiving said input frame signal for separating said input frame signal into said input overhead portion and said input subframe portion as a separated overhead portion and a separated subframe portion, respectively;

storing means coupled to said separating means for storing said separated subframe portion;

making means coupled to said separating means and responsive to said separated overhead portion and said output frame synchronous signal for making an output overhead portion determined by a phase difference between said input and said output frame synchronous signals; and multiplexing means coupled to said storing means and said making means and responsive to said output frame synchronous signal for delivering said output overhead portion into a portion of said output frame signal, said multiplexing means reading the stored channel signal from said storing means as read channel signals to deliver said read channel signals into the remaining portion of said output frame signal, so that said output frame signal consists of said output overhead portion and an output subframe portion carrying said read channel signals.

4. A device as claimed in claim 3, said input frame consisting of a plurality of time slots the number of which is represented by f1, x of the time slots being assigned to said input overhead portion, said channel signals being assigned with different channel numbers, a leading one of said channel signals being carried by a particular one of the time slots in said input subframe portion, the remaining channel signals being assigned to the remaining time slots in said input subframe portion and being arranged in the order of said channel signals, said input overhead portion comprising a message pointer P for indicating a number of time slots between said overhead portion and said particular time slot, said output frame synchronous signal being delayed from said input frame synchronous signal by y, x, P, and y being integers, wherein said output overhead portion comprises an output message pointer Px, said making means calculating said message pointer Px by the following formulae:

when $P \leq (y-x)$, $Px = (P-y) \bmod f1$, when $P > (y-x)$, $Px = (P-y+x) \bmod f1$, said output frame signal has said leading channel signal in a specific time slot in said output subframe portion, Px representing a number of time slots between said output overhead portion and said specific time slot.

5. A device for phase-aligning an input time-division multiplexed signal as an input frame signal having an input clock signal to an output frame synchronous signal synchronized with an output clock signal different from said input clock signal to produce an output frame signal, said input time-division multiplexed signal being formed by twice effecting pulse stuffing synchronization for a data signal and consisting of said data signal and first and second stuff pulses, said device comprising:

converting means for converting said input frame signal of said input clock signal into a clock converted frame signal of said output clock signal, a frame format of said clock converted frame signal consisting of a converted subframe portion carrying a plurality of converted channel signals and a converted overhead portion carrying a transport overhead signal for controlling transport of said channel signals, and said converted overhead portion comprising a converted frame synchronous signal, said converting means comprising:

first destuffing means responsive to said time-division multiplexed signal and said input clock signal for destuffing said time-division multiplexed signal by removing said second stuff pulse from said time-division multiplexed signal to produce a first destuffed signal, said first destuffing means removing a clock pulse of said input clock signal at a time position of said second stuff pulse to produce a first removed clock signal;

first buffer memory coupled to said first destuffing means for storing said first destuffed signal under control of said first removed clock signal;

first stuffing means responsive to said output clock signal for preparing a second clock signal having a mean frequency equal to said first removed clock signal, said first stuffing means reading said first destuffed signal from said first buffer memory under control of said second clock signal as a first read signal and adding third stuff pulses to said first read signal to produce a first stuffed signal;

second destuffing means receiving said output clock signal and said first stuffed signal for removing said third stuff pulses from said first stuffed signal to produce a second destuffed signal, said second destuffing means removing clock pulses of said output clock signal at time positions of said third stuff pulses to produce a second removed clock signal;

third destuffing means receiving said second removed clock signal and said second destuffed signal for removing said first stuff pulse from said second destuffed signal to produce a third destuffed signal, said third destuffing means removing a clock pulse of said second removed clock signal at a time position of said first stuff pulse to produce a third removed clock signal;

second buffer memory receiving said third destuffed signal and said third removed clock signal for storing said third destuffed signal under control of said third removed clock signal; and second stuffing means responsive to said output clock signal for preparing a third clock signal having a mean frequency equal to said third removed clock signal, said second stuffing means reading said third destuffed signal from said second buffer memory under control of said third clock signal as a second read signal and adding fourth stuff pulses to said second read signal to produce a second stuffed signal as said clock converted frame signal which is synchronized with said output clock signal;

separating means receiving said clock converted frame signal from separating said clock converted frame signal into said converted overhead portion and said converted subframe portion as a separated overhead portion and a separated subframe portion, respectively;

storing means coupled to said separating means for storing said separated subframe portion;

making means coupled to said separating means and responsive to said separated overhead portion and said output frame synchronous signal for making an output overhead portion determined by a phase difference between said converted and said output frame synchronous signals; and multiplexing means coupled to said storing means and said making means and responsive to said output frame synchronous signal for delivering said output overhead portion into a portion of said output frame signal, said multiplexing means reading the stored channel signals from said storing means as read channel signals to deliver said read channel signals into the remaining portion of said output frame signal, so that said output frame signal consists of said output overhead portion and an output subframe portion carrying said read channel signals.

6. A device for phase-aligning an input time-division multiplexed signal of an input clock signal, as an input frame signal, to an output frame synchronous signal synchronized with an output clock signal different from said input clock signal to produce an output frame signal, said device comprising:

converting means for converting said input frame signal of said input clock signal into a clock converted frame signal of said output clock signal, a frame format of said clock converted frame signal consisting of a converted subframe portion carrying a plurality of converted channel signals and a converted overhead portion carrying a transport overhead signal for controlling transport of said channel signals, and said converted overhead portion comprising a converted frame synchronous signal;

separating means receiving said clock converted frame signal from separating said clock converted frame signal into said converted overhead portion and said converted subframe portion as a separated overhead portion and a separated subframe portion, respectively;

storing means coupled to said separating means for storing said separated subframe portion;

making means coupled to said separating means and responsive to said separated overhead portion and said output frame synchronous signal for making an output overhead portion determined by a phase difference between said converted and said output frame synchronous signals; and multiplexing means coupled to said storing means and said making means and responsive to said output frame synchronous signal for delivering said output overhead portion into a portion of said output frame signal, said multiplexing means reading the stored channel signals from said storing means as read channel signals to deliver said read channel signals into the remaining portion of said output frame signal, so that said output frame signal consists of said output overhead portion and an output subframe portion carrying said read channel signals.

* * * * *